(12) United States Patent
Huang et al.

(10) Patent No.: US 7,555,146 B2
(45) Date of Patent: Jun. 30, 2009

(54) IDENTIFICATION RECOGNITION SYSTEM FOR AREA SECURITY

(76) Inventors: Tsongjy Huang, No. 139, Lung-Te Road, KaoHsiung City (TW); Itie Liu, 2F, No. 9, Lane 1, Ta-Hsin Street, Yung-Ho, Taipei Hsien (TW)

( * ) Notice: Subject to any disclaimer, the term of this patent is extended or adjusted under 35 U.S.C. 154(b) by 702 days.

(21) Appl. No.: 11/321,129

(22) Filed: Dec. 28, 2005

(65) Prior Publication Data
US 2007/0152807 A1    Jul. 5, 2007

(51) Int. Cl.
*G06K 9/00* (2006.01)
(52) U.S. Cl. ..................................... 382/115
(58) Field of Classification Search ................. 382/103, 382/115, 181, 209, 218; 348/159, 161, 169; 340/5.83, 521
See application file for complete search history.

(56) References Cited
U.S. PATENT DOCUMENTS

| | | | | |
|---|---|---|---|---|
| 5,319,698 | A * | 6/1994 | Glidewell et al. | 379/39 |
| 6,593,852 | B2 * | 7/2003 | Gutta et al. | 340/541 |
| 6,789,202 | B1 * | 9/2004 | Ko et al. | 726/23 |
| 7,239,724 | B2 * | 7/2007 | Sznba | 382/115 |
| 7,439,847 | B2 * | 10/2008 | Pederson | 340/5.81 |

* cited by examiner

*Primary Examiner*—Daniel G Mariam

(57) ABSTRACT

Disclosed is an identification recognition system for area security. The system consists of a plurality of area security sub-systems. Each sub-system includes an independent computer system as well as input/output devices, and all sub-systems are connected with internal audio and video communications. To expand the security coverage and enhance the integral security efficiency, this identification recognition system may also connect to external area security systems with real-time audio and video communications. With the saved information for the moving/living objects entering the security area as well as the fast computational ability, the identification recognition system for area security provides a real-time behavior analysis and habit recognition with high efficiency and accuracy of identification recognition.

18 Claims, 5 Drawing Sheets

IDENTIFICATION RECOGNITION SYSTEM FOR AREA SECURITY

FIELD OF THE INVENTION

The present invention generally relates to an identification recognition system, and more specifically to an identification recognition system for area security.

BACKGROUND OF THE INVENTION

The characteristic of a conventional technology for the area security identification recognition system is to perform security abnormality detection and identification recognition with respect to the specified security area. The logged information is only for the afterward inquiry and verification, and has never been used for real-time analysis, comparison and decision making for the occurrence of security conditions. With conventional identification recognition techniques, the general limitation and drawbacks for an area security system include limited identification recognition ability, unreliable accuracy, and slowness in recognition speed, etc. Other than this, with conventional technology, each area security system has limited coverage to its own local area, and there is no internal communication with video amongst all local security systems to assure the integral security efficiency. With such security loopholes, when there are multiple intruders invading multiple adjacent security areas simultaneously, it is hard for security management staff to perform in time efficient actions due to lacking of sufficient real-time global information regarding the whole security system.

Additionally, a conventional area security system also lacks of design for performing wired/wireless on-line communication with the other external/remote area security systems. Since such local security system cannot stay in turn with security events/activities of any external/remote security systems, it is hard to perform proactive/preventive actions to the best of a security system in order to minimize any potential damage. Similarly, any information regarding the security abnormality happened in a local security system cannot be broadcasted in time to the neighboring/remote security systems for helpful warning and preventive actions.

A conventional area security system also lacks of ability to save and utilize the information regarding the moving/living objects entering a security area. Without a fast computation ability to perform real-time behavior analysis and habit recognition, a conventional security system also has limited ability and accuracy to perform the function of identification recognition. Therefore, conventional area security systems have limited recognition functions, and easily misjudge an intruder or a non-intruder. This may trigger a false alarm.

SUMMARY OF THE INVENTION

To overcome the aforementioned drawbacks for area security systems, the present invention provides an identification recognition system for area security. The identification recognition system for area security according to the present invention consists of a plurality of sub-systems for area security identification recognition. Each sub-system further includes independent computer systems as well as input/output (I/O) devices, and all sub-systems are connected with internal communication and video information system. To expand the security coverage and enhance the integral security efficiency, this area security system according to the present invention can also connect to external area security systems with real-time communication and real-time video information system.

To enhance the accuracy and speed of identification recognition for moving/living objects entering the security area, the present invention uses a quotient analysis module to perform the comparison of the information/behavior pattern for a target moving/living object against the pre-saved reference or standard information/pattern. The identification recognition is determined by the information/pattern deviation between the target object and the pre-saved standard reference.

In addition to the quotient analysis module, the present invention also takes both advantages of mass storage and fast computation capacity of a computer system to iteratively verify the information of a target moving/living object against the saved standard reference information/pattern, and accomplishes fast and accurate identification recognition. The quotient analysis module of the present invention also performs behavior analysis and habit recognition for a target moving/living object to enhance the accuracy and sophistication of the identification recognition function. The result of the analysis as well as the episodic information is again saved back to the memory as the reference for the future identification recognition.

The whole system operation of the present invention is the computer system as mentioned and input/output (I/O) devices which can be controlled remotely and can sense and recognize a moving/living object entering a specified security area. Whenever a moving/living object within the security area is detected, the security system of the present invention activates a serious of actions, such as real-time continuously monitoring and recognizing the target object, informing a third party, activating the area security inquiry setup for the warning signal, etc.

To be more specific in reality, the input of such input/output device is used for detecting a moving/living object and transferring the detected information to the computer system. Examples of the detected information can be from an audio detector, an infrared sensor, an audio/video camera, detected electrical signals/communication signals, from a video information and/or electromagnetic detector, etc. The output devices include alarm devices, lighting warning devices, etc. Storage devices of a computer system include hard disk (HD), flash memory and synchronous retrieval access memory (SRAM), etc. Storage devices log and save information collected by input/output devices.

According to the present invention, the information analysis can be accomplished by statistical tools, such as trend graph, distribution graph, standard deviation, Cp/Cpk with iteration, determination by extrapolation with data set within a period, and auto-calibration, etc. From the result of the various analytical capabilities, the present invention then activates various serious of actions.

In order to minimize the accuracy deviation from the data collection, the preferred design according to the present invention includes one or more input devices arranged as an equilateral. For area geometry limitation, even a near equilateral arrangement of input devices helps.

The foregoing and other objects, features, aspects and advantages of the present invention will become better understood from a careful reading of a detailed description provided herein below with appropriate reference to the accompanying drawings.

DETAILED DESCRIPTION OF THE EMBODIMENTS

Figure 1:
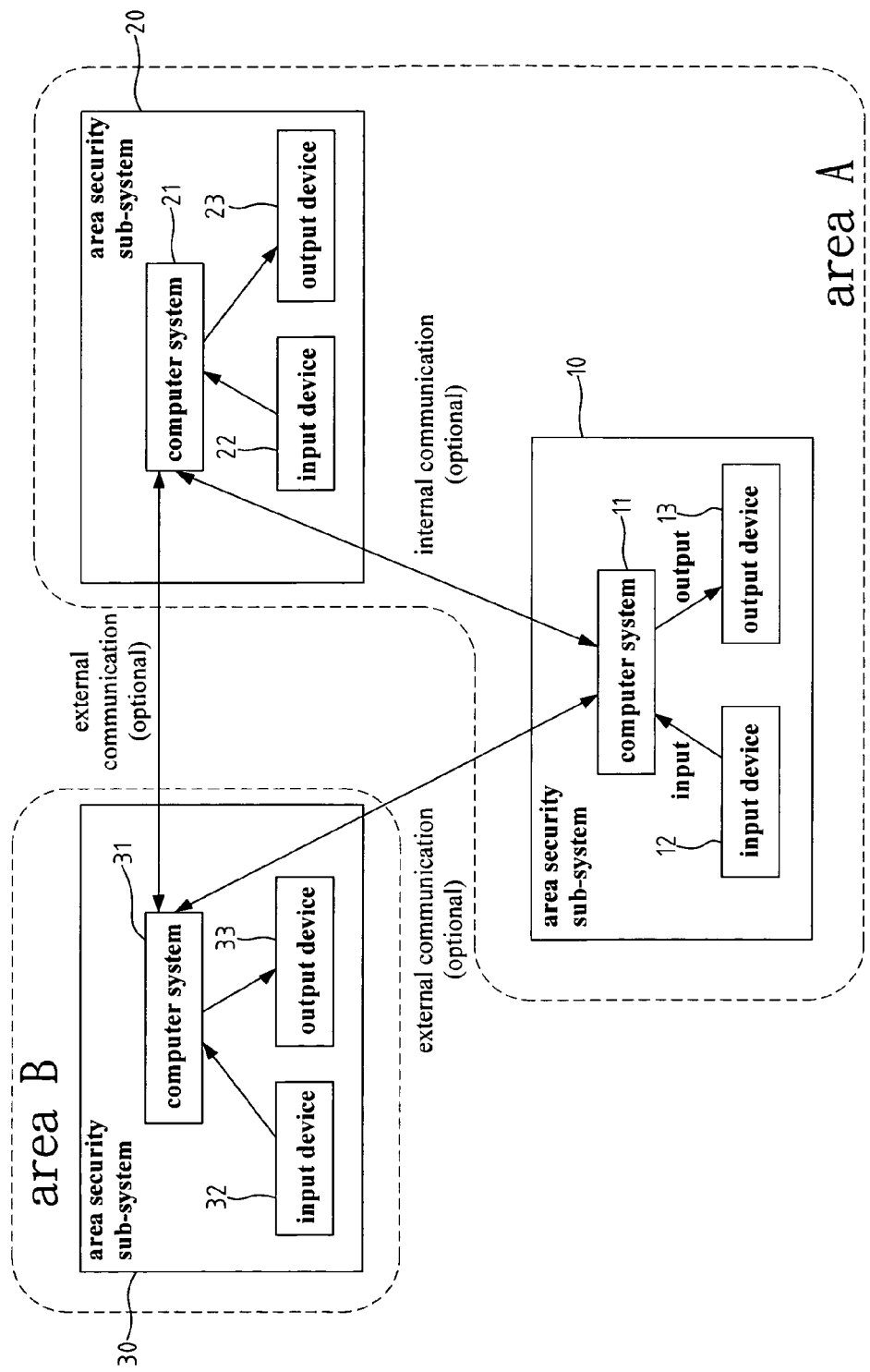
FIG. 1 is a block diagram of an identification recognition system for area security according to the present invention.

FIG. 1 is a block diagram of an identification recognition system for area security according to the present invention. Depending on the covered area or the actual requirement, the identification recognition system may comprise more than one area security sub-systems. Without losing generality and for simple explanation, FIG. 1 illustrates with two internal area security sub-systems 10 and 20, and one external area security sub-system 30. Referring to FIG. 1, each area security sub-system 10 and 20 includes its own computer system 11 and 21, input devices 12 and 22, and output devices, 13 and 23, respectively. Each computer system includes at least one memory device and one operating system software. The two internal security sub-systems 10 and 20 belong to the same security area A. The security sub-system 30 belongs to another security area B.

In FIG. 1, the mutual communication between two internal area security sub-systems within the same security area (for example the area security sub-system 10 and the area security sub-system 20) uses internal audio/video communication interface, while the mutual communication between two area security sub-systems from different security areas (for example, the area security sub-system 10/20 and the area security sub-system 30) uses external audio/video communication interface.

The security sub-system 30 includes a computer system 31, an input device 32, and an output device 33. Input devices 12, 22, and 32 for security sub-systems 10, 20, and 30, respectively, perform the function of detecting moving/living object, and collecting data. Output devices 13, 23, and 33 for security sub-systems 10, 20, and 30, respectively, perform function of initiating warning indication, such as lighting signals, warning signals, etc. for any detected security abnormality. Computer systems 11, 21, and 31 for security sub-systems 10, 20, and 30, respectively, perform function of determining security abnormality (according to the data detected and collected from input devices 12, 22, and 32), retrieving the security instruction pre-set in the security system, and transferring the instruction to output devices, and accomplishing an appropriate security action. In each security area, all security sub-systems are connected with internal communication and video information system.

The computer system used for an area security sub-system can be a general purpose computer system. The input device can be a motion detector, an audio detector/sensor, an infrared sensor, an audio/video camera, an electromagnetic detector/sensor, mobile phone with detecting/sensing function, etc. The output device can be an audio alarm device, a lighting alarm device, a message alarm device, etc.

According to the present invention, the real-time group interactive communication can be performed in parallel amongst all area security sub-systems. Each area security sub-system can choose to communicate with multiple sub-systems simultaneously or with only one sub-system. In FIG. 1, the area security sub-system 10, or the other area security master systems, B, C, D, etc., are not required to have individual computer system installed. Having only a computer system installed on the master security system A is sufficient for an adequate and efficient security operation.

In a security identification recognition system, multiple area security sub-systems can also form a multi-system with structures such as one master system with more independent sub-systems, or one master system with more slave sub-systems, etc. The multi-system with one master and more independent sub-systems may be linked via cable networks. There are varieties of ways for the data input for this type of multi-system security network. The function of the identification recognition can be categorized into two standards, high level and low level. In the following sections, the aforementioned concepts will be illustrated in detail with FIG. 2 and FIG. 3.

The area security sub-systems 10, 20, and 30, etc. can be configured with the same devices, or with different devices. In the aforementioned area security sub-systems, the area sub-system 10 may be either operated independently, or it may be coupled with the other sub-system 20 and form a cooperative operation unit. Other than this, the area security sub-system 10 may also link with the area security sub-system 30 and form a Master/Slave type of multi-system. Such operation alternatives will be described in detail in the following.

Figure 2:
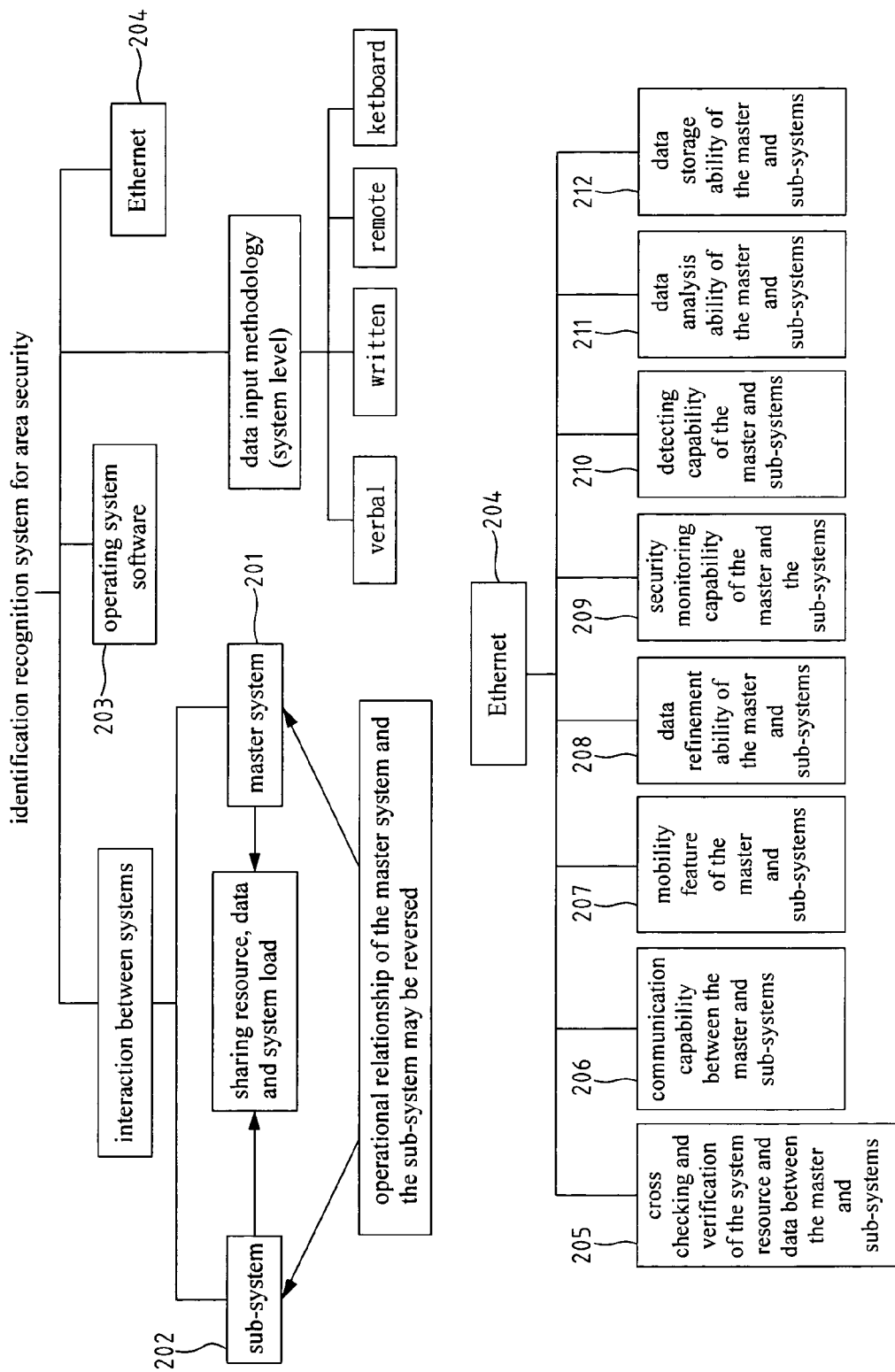
FIG. 2 illustrates the functional features of an identification recognition system for area security according to the present invention.

FIG. 2 illustrates the functional features of an identification recognition system for area security according to the present invention. The upper part of FIG. 2 illustrates the operational relationship between the master and the sub-system for the identification recognition from the perspective of the entire security sub-system. While the lower part of FIG. 2 illustrates the functional features between the master and the sub-systems of the identification recognition according to the present invention.

Referring to the upper part of FIG. 2, wherein, an identification recognition system for area security based on the present invention 200 may consist of a master system 201 and a sub-system 202, wherein, this master system 201 may be associated with the area security systems A or B in FIG. 1, and the sub-system 202 may be associated with the sub-systems 10, 20 of security system A and/or the sub-system 30 of security system B. The operation between the master system 201 and the sub-system 202 is a Master/Slave type of relationship as is shown in FIG. 1.

The Master/Slave operational relationship of the master system 201 and the sub-system 202 may be reversed by the software switching in the operating system for the present invention. The Master/Slave operational relationship may be reversed by manual or auto-switching. The auto-switch is done when the master system is out of order or improperly operated, and the Master/Slave operational relationship is reversed according to a predetermined priority. While the manual switch for reversing the Master/Slave operational relationship is done according to the practical need.

The master system 201 and the sub-system 202 may be connected through Ethernet 204 with electrical cables. The features and advantage of such security area design with the master system and sub-systems are that the master and all sub-systems have shared resource, data and system load, so that not only the entire security area coverage is expanded, the overall security efficiency is also improved. Additionally, each master system or sub-system may communicate with outside areas, such as police offices. Moreover, the data input methodology for such master and sub-systems may be ways in verbal, written, keyboard, and remote, etc.

Referring to the lower part of FIG. 2, wherein the functional features between the master system and the sub-systems include:

(a) The cross checking and verification of the system resource and data between the master and sub-systems, 205, highly improves the accuracy and reliability of the identification recognition function for the security system according to the present invention;

(b) The communication capability between the master and sub-systems, 206, may expand the extent for data collection as well as security region.

(c) The present invention has mobility feature of the master and sub-systems, 207. All associated devices may be portable/plug-in, and provides the ease for moving/rearranging the master and sub-subsystems, and provides the operation flexibility for adjusting the security area structure and coverage;

(d) The data refinement ability of the master and sub-systems, 208, which assures the accuracy/reliability of the result from such security system;

(e) The security monitoring capability of the master and the sub-systems, 209, which accomplishes the monitoring/controlling capability over the designated security area with input devices and the operating system software 203;

(f) The detecting capability of the master and sub-systems, 210, which is accomplished by using input devices to detect/sense and recognize any moving/living object entering the designated security area;

(g) The data analysis ability of the master and sub-systems, 211, which accomplishes and enhances the analytical and recognition ability over the target moving/living objects with the quotient analysis technique which will be explained in more detail later;

(h) The data storage ability of the master and sub-systems, 212, which greatly improves the recognition ability, speed, and accuracy for the target moving/living object by using the saved key information security nature for the target moving/living object.

Figure 3:
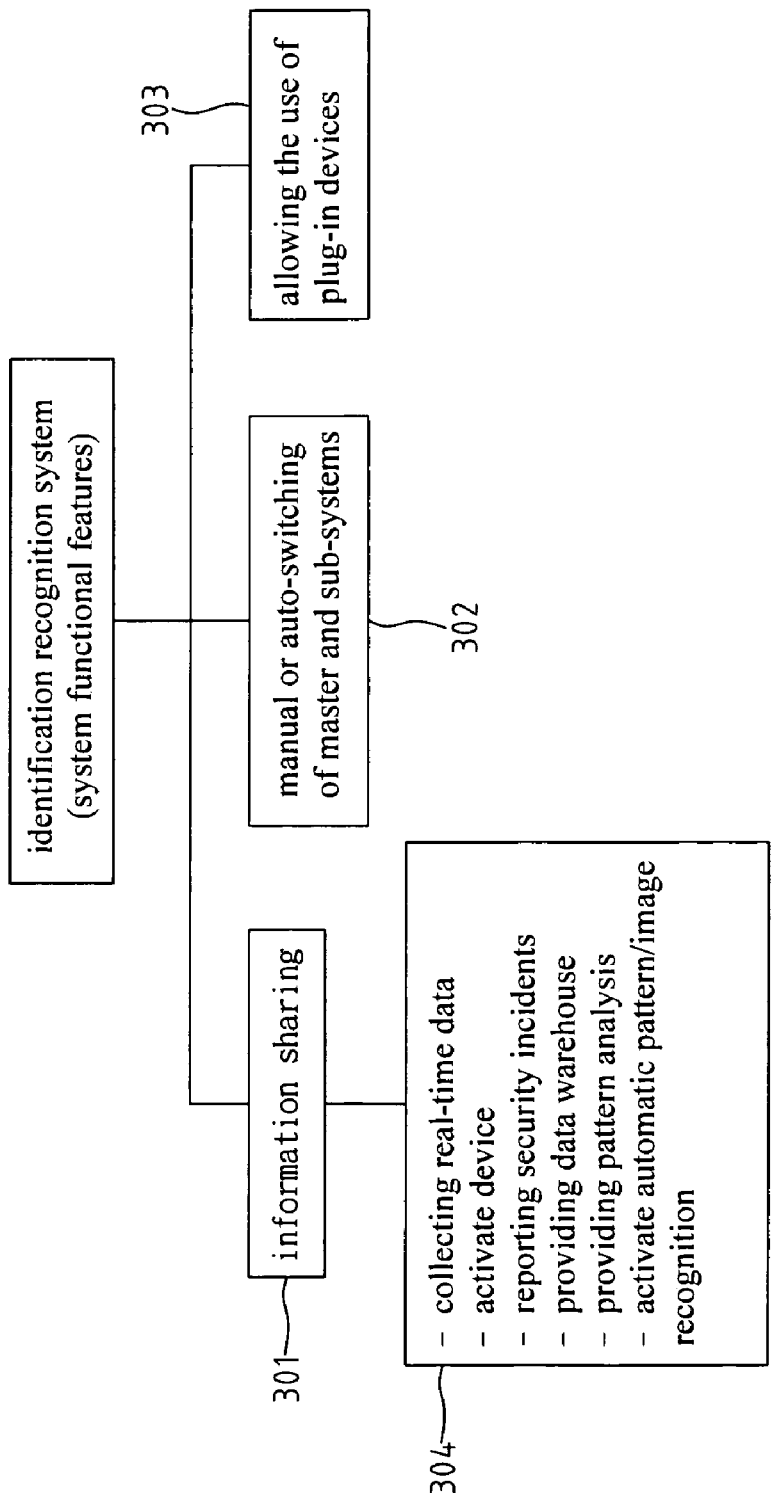
FIG. 3 further explains the system functional features of an identification recognition system of the present invention.

FIG. 3 further explains the system functional features of an identification recognition system according to the present invention. Referring to FIG. 3, the system functional features include: (1) Information Sharing, 301, which expands the extent for both data collection and security region; (2) Providing dual modes for manual or auto-switching of mater and sub-systems, 302, which provides operational flexibility; (3) Allowing the use of plug-in devices for master and sub-systems, 303, which provides the ease for moving/rearranging the master and sub-subsystems, and flexibility for adjusting the security region structure and coverage.

The information sharing, as labeled 304, further includes the following functions: (a) collecting real-time data, so that the security system can provide real-time conditions for security abnormality; (b) activate device, which can initiate warning signals/actions such as sound alarm, lighting signals, or vibration devices, etc.; (c) reporting security incidents, which reports security abnormalities to the on-duty security or management staff in an appropriate manner; (d) providing data warehouse, which effectively improves the quality, ability, and speed for the identification recognition via saving sufficient and enough of the security relevant key information for the target moving/living objects; (e) providing pattern analysis, which assures the accuracy for recognizing the shape, behavior, and motion of a target moving/living objects entering the designated security area; and (f) providing a function to activate automatic pattern/image recognition when a target object is detected with actions intending to intrude the designated security area: through detecting/sensing the finger prints, shape, normal/stable voice, chirography, or any other forms of pattern/image of the target moving/living object.

Figure 4:
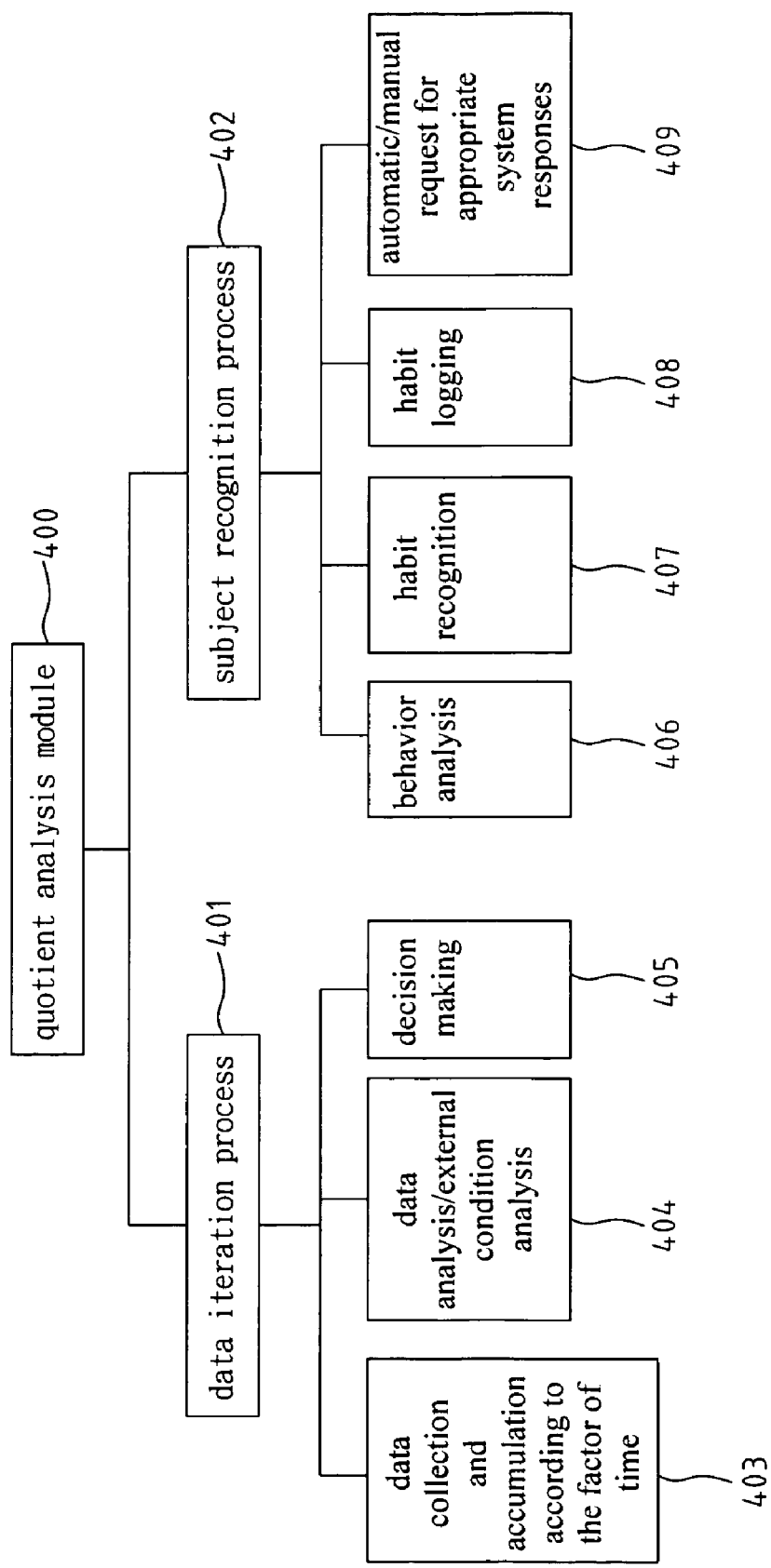
FIG. 4 explains the functions and characteristics of an identification recognition system for area security of the present invention through the use of quotient analysis module.

Referring to FIG. 4, in reality, the identification recognition system for area security according to the present invention, of which the functions and features are superior to a conventional system, includes a quotient analysis module 400 that is provided to perform the behavior analysis and habit recognition for the target moving/living object entering the designated security area, such that an target object can be accurately recognized and monitored. The quotient analysis module mainly includes two major items, data iteration process 401 and subject recognition process 402, which are described in detail as follows.

The data iteration process 401 includes the following work items 403-405.

Work Item 403: Data collection and accumulation according to the factor of time. In other words, this item involves periodically performing data collection/accumulation at intervals of time units, such as date, minute, second, etc., so that the data can be used for later analysis.

Work Item 404: Data analysis/external condition analysis. In an iteration manner, this item involves comparing/verifying the collected information against the system pre-saved information, so that the target object is accurately recognized.

Work Item 405: Decision Making. According to the result of comparison and analysis, this item involves decision making on the identification and recognition over the target object.

Similarly, the subject recognition process 402 includes the following work items 406-409.

Work Item 406: Behavior Analysis. According to the result from the data analysis and/or external condition analysis, this item involves recognizing and identifying a specific behavior model on the target object.

Work Item 407: Habit recognition. According to the result from the behavior analysis 406, this item involves recognizing a specific habit model on the target object.

Work Item 408: Habit logging. This item involves data recording and storing a specific habit model on the target object for the next recognition on the same target object.

Work Item 409: Automatic/Manual request for appropriate system responses.

This work item provides operation flexibility for system related responses.

Please note that the aforementioned quotient analysis is accomplished by the operating system software of the area security identification recognition system according to the present invention. The OS software instructs the computer system in each area security system how to save the identification data of a target object into memory units, how to analyze the saved identification data, and how to perform recognition decision, etc. Such computer system can provide an appropriate and accurate real-time response to security incidents.

Figure 5:
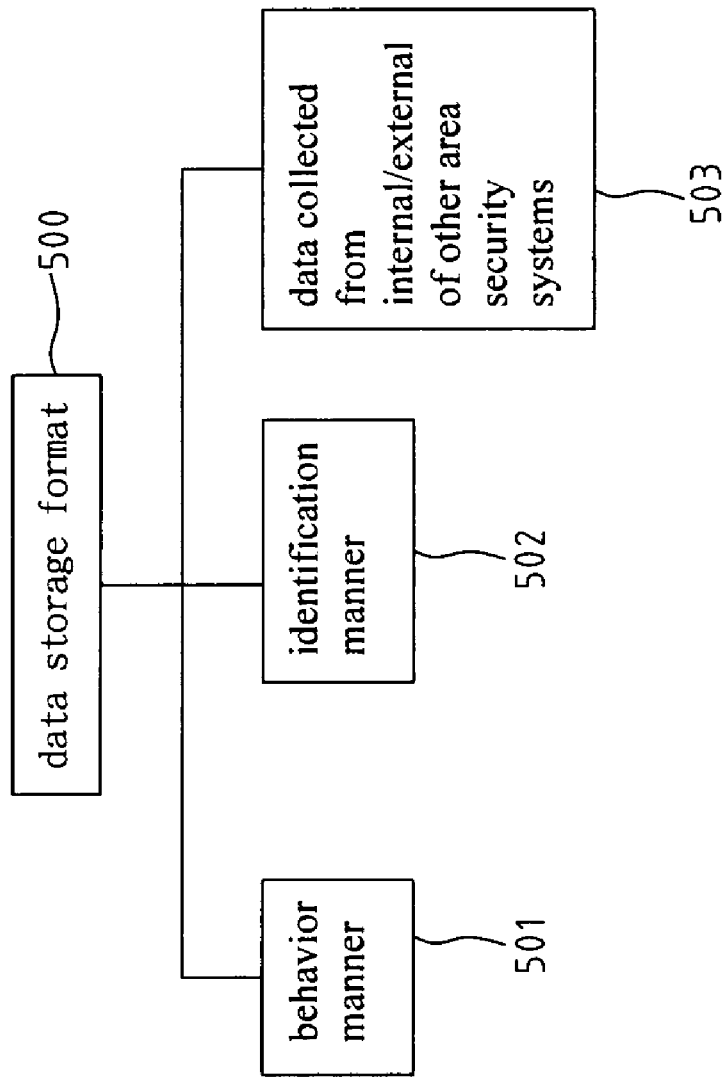
FIG. 5 shows an example of the data storage format/data structure for the present invention.

Finally, FIG. 5 illustrates an example of the data storage format/data structure 500 according to the present invention. Referring to FIG. 5, such data storage format 500 comprises three major data fields: behavior manner 501, identification manner 502, and any data collected from internal/external of other area security systems 503. The 501 data field saves the dynamic/progressive habit related information of each target object in each security area. The identification manner 502 field saves the identification recognition related information of each target object in each security area. The data field for any data collected from internal/external of other area security systems 503 saves information from other sub-systems within the same security area (for example sub-system 10), from other security area (such as B), or from outside of the local security area, etc.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An identification recognition system for area security, comprising a plurality of area security sub-systems that are connected with an internal communication and video information system, each said sub-system further comprising:
    a computer system that includes one or more memory devices and an operating system software;
    an input device that detects moving/living objects, and collects data; and
    an output device;
    wherein said computer system, based on said data detected and collected by said input device, determines the occurrence of security abnormality conditions, retrieves preset area security action instructions and initiates an appropriate security action instruction to said output device to perform said appropriate security action instruction, and said output device activates alarm signals according to said appropriate security action instruction for security abnormality determined by said computer system; and
    wherein said area security sub-systems form a multi-system including one master system and a plurality of slave sub-systems with master/slave operational relationship, said master system and said slave sub-systems have shared system resource, data and system load for expanding security area coverage and improving security efficiency, and said master/slave operational relationship in said multi-system is switchable.

2. The identification recognition system for area security as claimed in claim 1, wherein said computer system is a general purpose computer system.

3. The identification recognition system for area security as claimed in claim 1, wherein said input device is one of a motion detector, an audio detector/sensor, an infrared sensor, an audio/video camera, an electromagnetic detector/sensor, and a mobile phone with detecting/sensing function.

4. The identification recognition system for area security as claimed in claim 1, wherein said output device is one of an audio alarm device, a lighting alarm, and a message alarm device.

5. The identification recognition system for area security as claimed in claim 1, wherein said area security sub-systems are connected with real-time group interactive communication.

6. The identification recognition system for area security as claimed in claim 1, wherein said master system and said plurality of slave sub-systems are connected via a network.

7. The identification recognition system for area security as claimed in claim 1, wherein said data input for said master/sub-systems is from any combinations of formats in verbal, written, keyboard, and remote.

8. The identification recognition system for area security as claimed in claim 1, wherein the functions of said identification recognition system is categorized into two standards, high level and low level.

9. The identification recognition system for area security as claimed in claim 8, wherein said low level standard functions of said identification recognition system include the following items:
    (a) performing cross checking and verification of said system resource and data between said master system and slave sub-systems to improve the accuracy and reliability of the functions of said identification recognition system;
    (b) performing real-time communication between said master system and said slave sub-systems to expand the extent for data collection as well as security region;
    (c) providing portable/mobility feature of said multi-system to flexibly adjust security area structure and coverage;
    (d) providing data refinement for said master system and said plurality of slave sub-systems, to assure accuracy of results from said area security sub-systems;
    (e) providing security monitoring for said master system and said plurality of slave sub-systems with input devices and said operating system software, to accomplish monitoring/controlling function over the security area coverage for said master system and said plurality of slave sub-systems;
    (f) performing detecting function for said master system and said plurality of slave sub-systems by using the input devices to detect/sense, and recognize a moving/living object entering a specialized security area;
    (g) performing data analysis function for said master system and said plurality of slave sub-systems by using a quotient analysis module to enhance analytical and recognition ability for detecting target moving/living objects; and
    (h) providing data storage ability for said master system and said plurality of slave sub-systems including saving security natured key information regarding said target moving/living objects to greatly improve speed and accuracy of said recognition ability, for said target moving/living objects.

10. The identification recognition system for area security as claimed in claim 8, wherein said high level standard functions further include the functions of collecting real-time data, activating device, reporting security incidents, providing data warehouse, analyzing pattern, and activating automatic pattern/image recognition.

11. The identification recognition system for area security as claimed in claim 1, wherein the functions of said identification recognition system include information sharing, providing manual/automatic dual modes for switching said master system and said slave sub-systems, and allowing the use of plug-in devices.

12. The identification recognition system for area security as claimed in claim 1, wherein said master/slave operational relationship of said master system and said plurality of slave sub-systems is reversed by either manual switching or automatic switching.

13. The identification recognition system for area security as claimed in claim 1, wherein said identification recognition system uses a quotient analysis module to provide behavior analysis and habit recognition for detecting a target moving/living object entering said security area.

14. The identification recognition system for area security as claimed in claim 13, wherein said quotient analysis module is accomplished by said operating system software of said computer system.

15. The identification recognition system for area security as claimed in claim 13, wherein said quotient analysis module includes two tasks of data iteration process and subject distinction.

16. The identification recognition system for area security as claimed in claim 15, wherein said data iteration process includes execution of the following task items:
   data collection and accumulation according to the time when said target moving/living object is detected;
   data analysis and/or external condition analysis that compare said collected data with pre-saved information in said identification recognition system; and
   decision making on identification and recognition over said target moving/living object according to the result of comparing with pre-saved information and said data analysis and/or external condition analysis.

17. The identification recognition system for area security as claimed in claim 16, wherein said subject distinction includes execution of the following task items:
   behavior analysis, by recognizing and identifying a specific behavior model for said target moving/living object according to said result from said data analysis and/or external condition analysis;
   habit recognition, by recognizing a specific habit model for said target moving/living object according to the result from said behavior analysis;
   habit logging, by recording data and storing a specific habit model for said target moving/living object for next recognition on said same target moving/living object; and
   making appropriate automatic/manual system responses.

18. An identification recognition system for area security, comprising a plurality of area security sub-systems that are connected with an internal communication and video information system, each said sub-system further comprising:
   a computer system that includes one or more memory devices and an operating system software;
   an input device that detects moving/living objects, and collects data; and
   an output device;
   wherein said computer system, based on said data detected and collected by said input device, determines the occurrence of security abnormality conditions, retrieves preset area security action instructions and initiates an appropriate security action instruction to said output device to perform said appropriate security action instruction, and said output device activates alarm signals according to said appropriate security action instruction for security abnormality determined by said computer system; and
   wherein said identification recognition system arranges a data structure for saving said collected data, and said data structure includes at least the following three data fields:
   a data field for behavior manner that saves the information of dynamic/progressive habit nature for each target object in each security area;
   a data field for identification manner that saves the information of identification recognition nature for each said target object in each security area; and
   a data field for collected data from internal/external of other security areas, in which information from other sub-systems within a same security area, from other security area, or from outside of said same security area and said other security area, is saved.

* * * * *